(12) United States Patent
Djabarov et al.

(10) Patent No.: US 9,110,740 B1
(45) Date of Patent: Aug. 18, 2015

(54) PER-VALUE USER NOTIFICATION THROTTLING IN SOFTWARE APPLICATION

(75) Inventors: Guerogui Djabarov, Tucson, AZ (US); Yefim Tetelman, Belmont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/617,640

(22) Filed: Sep. 14, 2012

Related U.S. Application Data

(63) Continuation of application No. 12/246,283, filed on Oct. 6, 2008, now Pat. No. 8,316,382.

(60) Provisional application No. 60/960,619, filed on Oct. 5, 2007.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .................... *G06F 9/542* (2013.01)

(58) Field of Classification Search
USPC .................. 719/318, 320; 709/223
See application file for complete search history.

(56) References Cited

U.S. PATENT DOCUMENTS

| | | | |
|---|---|---|---|
| 6,487,590 B1 * | 11/2002 | Foley et al. | 709/223 |
| 7,523,397 B2 | 4/2009 | Cheung et al. | |
| 7,917,855 B1 * | 3/2011 | Satish et al. | 715/744 |
| 2003/0167353 A1 | 9/2003 | de Bonet et al. | |
| 2006/0031533 A1 | 2/2006 | Goodman et al. | |
| 2006/0036720 A1 | 2/2006 | Faulk, Jr. | |
| 2007/0218884 A1 | 9/2007 | Kuwahara et al. | |
| 2007/0253340 A1 | 11/2007 | Varney et al. | |

OTHER PUBLICATIONS

Wegscheider, F., "Minimizing Unnecessary Notification Traffic in the IMS Presence System," 1st International Symposium on Wireless Pervasive Computing, 2006, 6 pages.
Co-pending U.S. Appl. No. 12/246,283 inventors Djabarov et al., filed Oct. 6, 2008.

* cited by examiner

*Primary Examiner* — Diem Cao
(74) *Attorney, Agent, or Firm* — Fish & Richardson P.C.

(57) ABSTRACT

The present invention throttles notifications to a user based on changes in particular state values. A computer-implemented method manages notifications of changes to one or more settings of an application. The method includes: displaying a first notification of a change of a setting to a value; updating a count of notifications displayed for the value; and throttling a subsequent notification of a subsequent change of the setting to the value if the count exceeds a threshold.

9 Claims, 3 Drawing Sheets

PER-VALUE USER NOTIFICATION THROTTLING IN SOFTWARE APPLICATION

This application is a continuation of U.S. Nonprovisional patent application Ser. No. 12/246,283, filed Oct. 6, 2008, which claims the benefit of U.S. Provisional Pat. Appl. No. 60/960,619, filed Oct. 5, 2007, both of which are incorporated by reference herein in their entirety.

BACKGROUND

1. Field of the Invention

The present invention is related to notifications within a software application.

2. Background Art

A software application sometimes highlights or confirms a state change in the software application through some form of user notification. For example, a software application can provide a notification when a certain software event has occurred, such as when a software setting has changed or is about to be changed. The notification in a window-based user interface, for example, is typically provided in the form of a dialog box which alerts the user to the change of state. The user is then typically offered a choice through interaction with the dialog box or bubble to proceed or cancel the state change. Such user notification schemes in software applications can quickly become a nuisance for a user if the notifications are triggered too frequently. While the number of notifications provided to a user can be limited to a predetermined number within a predefined time period, it is preferable to provide a user notification scheme with an improved user experience.

BRIEF SUMMARY

The present invention throttles notifications to a user based on changes in particular state values. A computer-implemented method manages notifications of changes to one or more settings of an application. The method includes: displaying a first notification of a change of a setting to a value; updating a count of notifications displayed for the value; and throttling a subsequent notification of a subsequent change of the setting to the value if the count exceeds a threshold.

In another embodiment, a system manages notifications of changes to one or more settings of an application. The system includes an event notifier module that displays a first notification of a change of a setting to a value. An event counter module updates a count of the notifications displayed for the value. A throttle module throttles a subsequent notification of a subsequent change of the setting to the value if the count exceeds a threshold.

In a third embodiment, a computer program product has control logic stored therein, and the control logic causes a computer to manage notifications of changes to one or more settings of an application. The control logic causes the computer to display a first notification of a change of a setting to a value. The control logic also causes the computer to update a count of the notifications displayed for the value. Finally, the control logic causes the computer to throttle a subsequent notification of a subsequent change of the setting to the value if the count exceeds a threshold.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and to use the invention.

Embodiments of the invention are described with reference to the accompanying drawings. In the drawings, like reference numbers may indicate identical or functionally similar elements.

DETAILED DESCRIPTION

In embodiments, a new user notification system and method for a software application operating on a computing device are herein disclosed. The software application keeps track of not only how many times a particular notification has been triggered but also a particular state change value associated with an event that triggered the notification. The notifications to a user can then be throttled on a per-value basis. Accordingly, a software application can throttle back the notifications when the notifications are based on a same value—and can resume full notifications when the new notifications are based on a different value.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
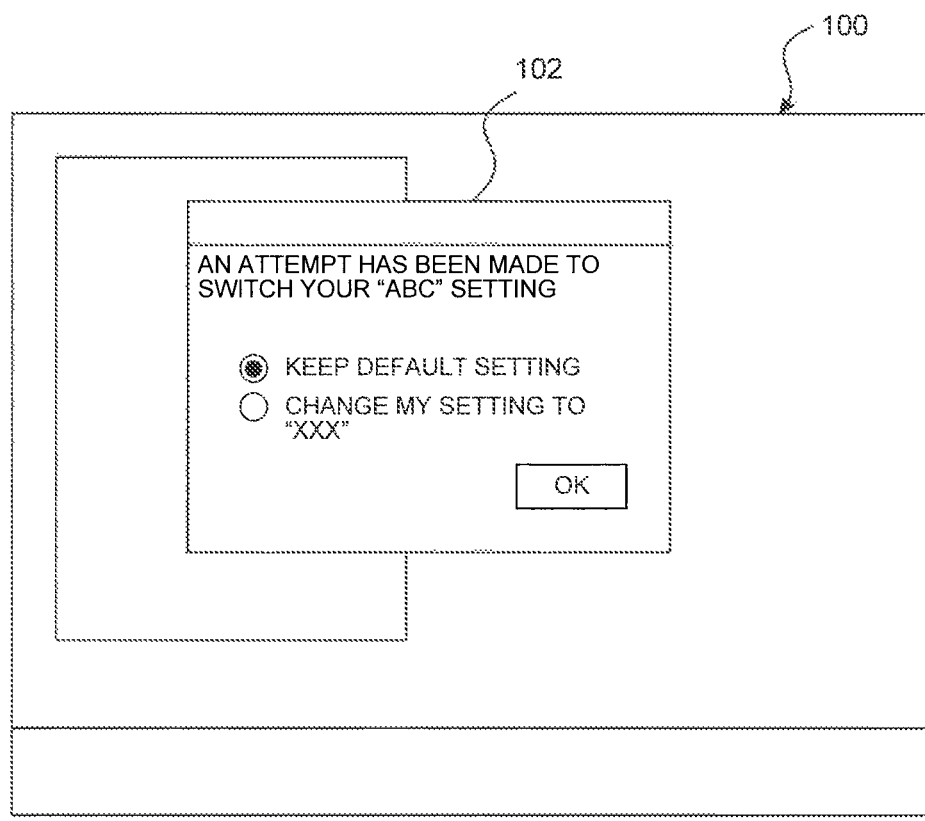
FIG. 1 shows an example user interface display containing a notification window.

FIG. 1 illustrates a user interface display 100 of an example software application operating on a computing device. The user interface display integrates a notification mechanism, as illustrated by a notification dialog box 102. The notification indicates some event has triggered representing some form of state change in the software application. For example, in FIG. 1, the notification indicates that a setting in the software application has been changed to a value of "XXX". The notification dialog box further indicates that the user may retain the original settings or may allow the setting to be changed to the value of "XXX" by selecting one of the options in the dialog box.

It should be noted that FIG. 1 is merely illustrative and that the present invention is not limited to the user interface depicted in FIG. 1.

Figure 2:
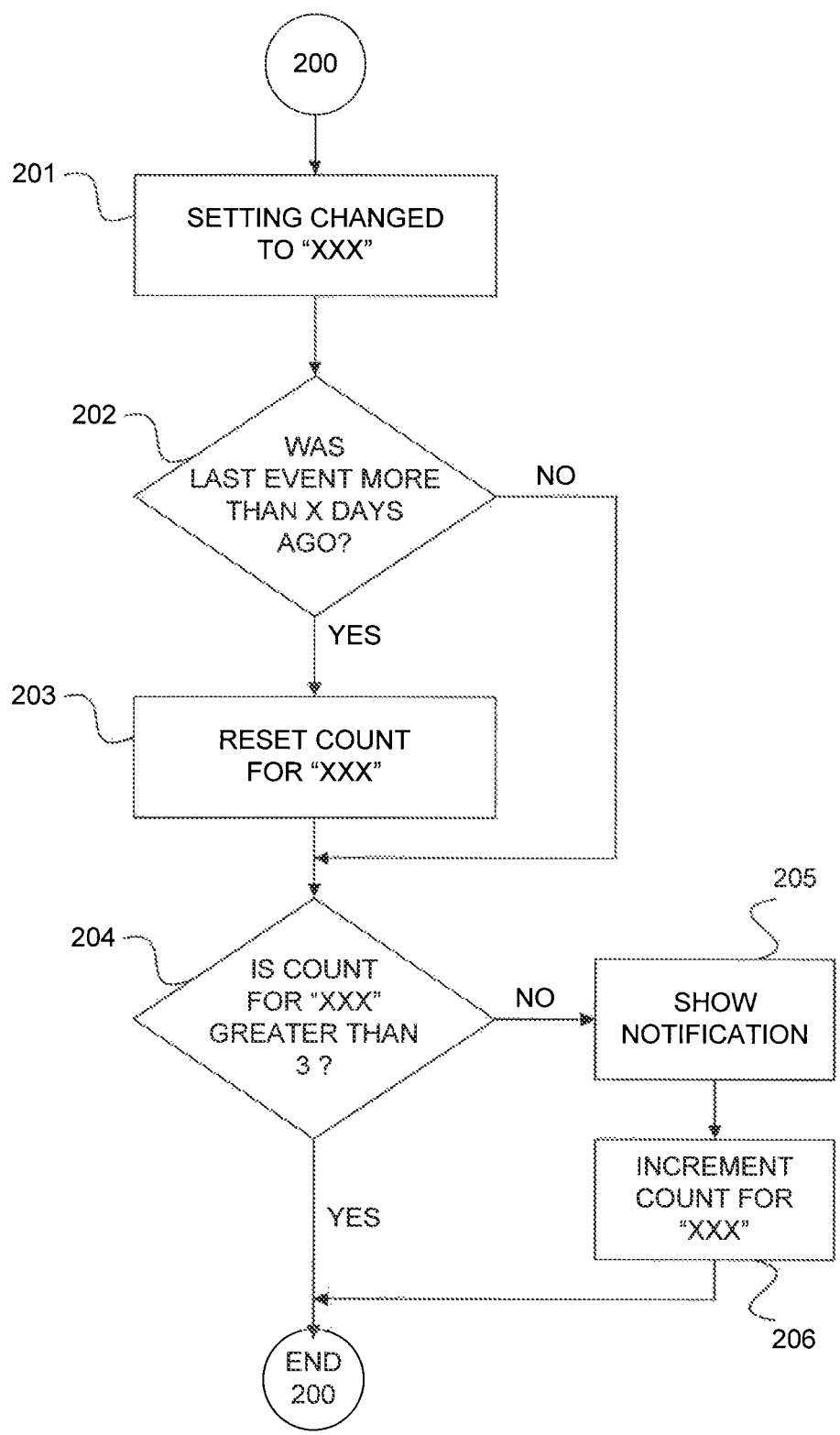
FIG. 2 is a flowchart showing a method for throttling notifications according to an embodiment of this invention.

FIG. 2 is a flowchart showing a method for throttling notifications according to an embodiment of this invention. Routine 200 illustrates processing that may be performed by a computing device in determining whether to display a notification such as, for example, notification dialog box 102 in FIG. 1. A table may maintain a count of how many times the notification has been displayed for the user per value associated with the setting change. Examples are provided in describing this method are illustrative and are not intended to limit the present invention. Step 201 detects an event triggered by the relevant state change, for instance in the above example, the change of the software application setting to value "XXX". As an illustrative example, the state change may be a change of a homepage setting to a value "www.example.com".

Step 202 determines how long has it been since the notification was last triggered. If the last event occurred more than some predetermined period of time, e.g., after a few days or a week of active usage of the computing device by the user, the computing device resets the count for the value "XXX" at step 203. For example, if the predetermined period of time was three days and the last attempt to change a homepage setting to "www.example.com" was four days ago, the count for the value "www.example.com" would be reset to zero. Accordingly, if the event occurs too frequently, the count will not reset and the user will not be required to receive excessive notifications. It can be preferable to discount time where the user has not used the computing device for a long time. For example, it would be preferable that the user not be bombarded with various notifications after a long period of non-use, e.g., after a vacation.

Step 204 determines whether the count has exceeded some throttling threshold for the value "XXX", e.g., three times. If the count does not exceed the throttling threshold, then the notification is displayed to the user through the user interface at step 205. The count for the value "XXX" is then incremented at step 206.

If the count has exceeded the throttling threshold, the computing device can decline to show the notification or can downgrade the notification to a more innocuous form, e.g., the computing device can cause the user interface to display an icon or a bubble from a status bar rather than a full dialog box. The computing device can vary the duration of the visibility of the bubble or the icon, depending on the count.

As an illustrative example, suppose the notification throttling threshold is three. An event tries to change a homepage setting to the value "www.example.com". If the present count for "www.example.com" is three, then step 205 shows a notification, such as notification dialog 102 in FIG. 1, and step 206 increments the count for "www.example.com" to four. If the present count for "www.example.com" is four, then there may be no notification, or the notification may be more innocuous.

As noted above, a count is maintained for different setting values. A separate count can be maintained for each unique setting value or, alternatively, for ranges or groups of setting values. For example, where the setting value is a website address or a URL, the count can be maintained for each hostname rather than for each unique URL. This may be implemented, for example, by representing values as regular expressions.

Throttling can then be carried out based on changes in one or more of the different setting values. Throttling can be carried out when counts of notifications made for changes in different setting values exceed a throttling threshold. Different throttling thresholds can also be used to control throttling differently for different setting values.

For example, suppose a notification throttling threshold is three for a setting value corresponding to a homepage setting value "www.example1.com", and a second notification throttling threshold is thirty for a setting value corresponding to a homepage setting value "www.example2.com." In this way, a user experience of notifications can be regulated differently for different setting values.

Where a single computing device is used by multiple users with different user accounts, the computing device can maintain the counts on a per user basis.

Figure 3:
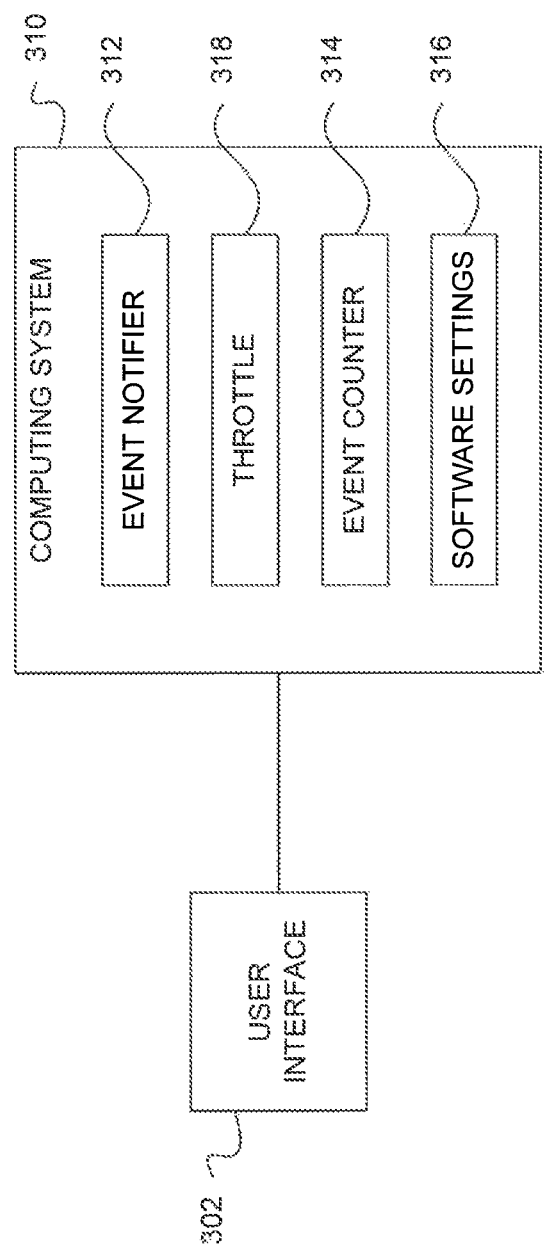
FIG. 3 is an architecture diagram for a system for throttling notifications according to an embodiment of this invention.

FIG. 3 is an architecture diagram for a system 300 for throttling notifications according to an embodiment of this invention. System 300 contains a user interface 302 coupled to a computing system 310.

User interface 302 enables a user to interact with computing system 310. User interface 302 may include an output display, such as a computer monitor. User interface 302 may include an input device, such as a keyboard, mouse, or touch screen.

Computing system 310 may be implemented on any client device that can support web browsing. Such a client device can include, but is not limited to, a personal computer, mobile device such as a mobile phone, workstation, embedded system, game console, television, set-top box, or any other computing device. Such a client device may include, but is not limited to, a device having a processor and memory for executing and storing instructions. Such a client device may include software, firmware, and hardware. Software may include one or more applications and an operating system. Hardware can include, but is not limited to, a processor, and memory.

Computing system 310 includes an event notifier 312, throttle 318, event counter 314, and software settings 316. Each of event notifier 312, event counter 314, and software settings 316 may be implemented in software, hardware, firmware, or any combination thereof.

Software settings 316 maintain values for settings for a particular software application. For example, software settings 316 may maintain a value for a homepage setting (not shown).

Event counter 314 maintains a count for each value. For example, a count of how many times a notification has been displayed for a user per value associated with a setting change may be maintained. For example, if there have been two attempts to change a homepage setting to value "www.example.com" since the last time the count was reset, the count for value "www.example.com" would be two. In another embodiment, event counter 314 may maintain counts for each value for each user. In an example of that embodiment, if there have been two attempts to change a homepage setting for a user "JDoe" to value "www.example.com", the count for that value for that user would be two. In still another example, event counter 314 may maintain counts for each value or groups of values as described above for each user. As an illustrative example, event counter 314 may maintain counts for each value in a table or relational database.

Event notifier 312 displays a notification, such as notification dialog box 102 in FIG. 1, to the user. Event notifier 312 may use user interface 302 to display the notification. Event notifier 312 may display the notification with a notification dialog box or in a less obtrusive form, e.g., the event notifier 312 can cause the user interface to display an icon or a bubble from a status bar rather than a full dialog box.

Throttle 318 determines when the counts exceed one or more throttling threshold and throttles further display of notifications of changes in setting values when a throttling threshold is exceeded. Throttle 318 may be triggered by an attempt to make a change in software settings 316 to a new value. Once triggered, throttle 318 may use a count for the value maintained by event counter 314. If the count is at or below a threshold, throttle 318 may signal event notifier 318 to display a notification. If the count exceeds the threshold, throttle 318 may signal event notifier 318 to display the notification in a less obtrusive manner or may not signal event notifier 318.

The present invention is not limited to monitoring state changes with event counts that count the number of occurrences of events. Event frequency or other state indicators for events may be used.

The Summary and Abstract sections may set forth one or more but not all exemplary embodiments of the present invention as contemplated by the inventor(s), and thus, are not intended to limit the present invention and the appended claims in any way. The present invention has been described above with the aid of functional building blocks illustrating the implementation of specified functions and relationships thereof.

The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for managing notifications indicating one or more setting changes, comprising:
    displaying a first notification indicating a setting change to a software application, wherein the first notification includes a particular setting value to which a particular setting in the software application has been changed;
    updating a measure of notifications displayed indicating the setting change, wherein the measure of notifications includes a count of notifications including the particular setting value that have been displayed;
    receiving a subsequent notification including the particular setting value to be displayed;
    identifying a throttling threshold to apply to the subsequent notification based at least in part on the particular setting value;
    determining that the measure of notifications exceeds the throttling threshold; and
    throttling the subsequent notification in response to determining that the measure of notifications exceeds the throttling threshold.

2. The method of claim 1, wherein determining that the measure of notifications exceeds the throttling threshold is based on one or more state indicators.

3. A system, comprising:
    a memory; and
    at least one processor coupled to the memory and configured to:
        display a first notification indicating a setting change to a software application, wherein the first notification includes a particular setting value to which a particular setting in the software application has been changed;
        update a measure of notifications displayed indicating the setting change, wherein the measure of notifications includes a count of notifications including the particular setting value that have been displayed;
        receive a subsequent notification including the particular setting value to be displayed;
        identify a throttling threshold to apply to the subsequent notification based at least in part on the particular setting value;
        determine that the measure of notifications exceeds the throttling threshold; and
        throttle the subsequent notification in response to determining that the measure of notifications exceeds the throttling threshold.

4. The system of claim 3, wherein identifying the throttling threshold includes determining that the particular setting value is included in a group of setting values associated with the throttling threshold.

5. The system of claim 4, wherein the group of setting values associated with the throttling threshold is represented by a regular expression.

6. The system of claim 3, wherein determining that the measure of notifications exceeds the throttling threshold is based on one or more state indicators.

7. A tangible computer-readable device having instructions stored thereon that, when executed by at least one computing device, causes the at least one computing device to perform operations, the operations comprising:
    displaying a first notification indicating a setting change to a software application, wherein the first notification includes a particular setting value to which a particular setting in the software application has been changed;
    updating a measure of notifications displayed indicating the setting change, wherein the measure of notifications includes a count of notifications including the particular setting value that have been displayed;
    receiving a subsequent notification including the particular setting value to be displayed;
    identifying a throttling threshold to apply to the subsequent notification based at least in part on the particular setting value;
    determining that the measure of notifications exceeds the throttling threshold; and
    throttling the subsequent notification in response to determining that the measure of notifications exceeds the throttling threshold.

8. The computer-readable device of claim 7, wherein identifying the throttling threshold includes determining that the particular setting value is included in a group of setting values associated with the throttling threshold.

9. The device of claim 8, wherein the group of setting values associated with the throttling threshold is represented by a regular expression.

* * * * *